July 7, 1936.   R. H. KAUFMANN   2,046,952
ELECTRICAL REGULATING SYSTEM
Filed Nov. 1, 1934
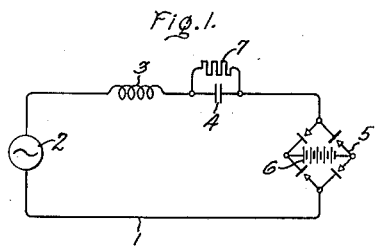
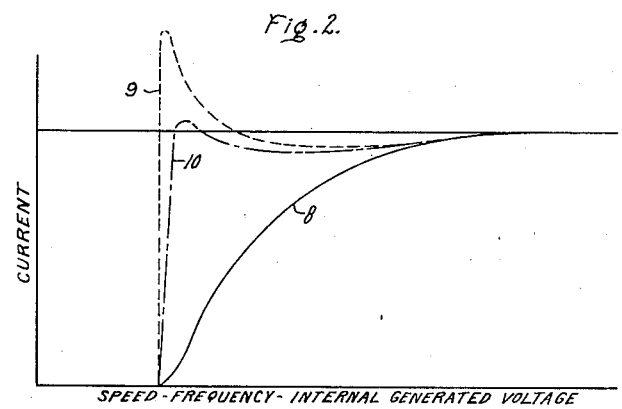
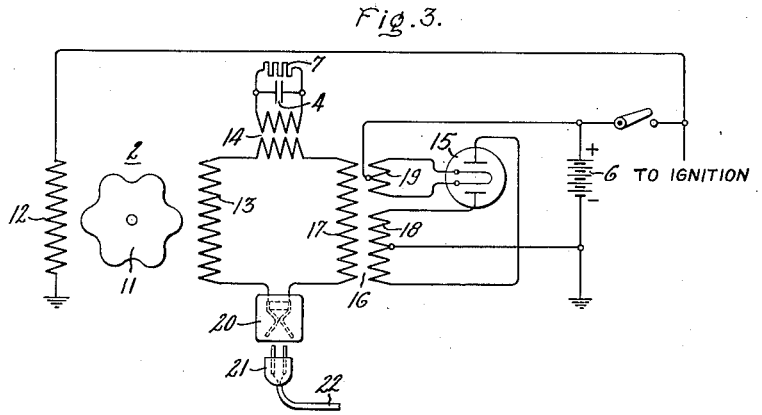
Inventor:
Richard H. Kaufmann,
by Harry E. Dunham
His Attorney.

Patented July 7, 1936

2,046,952

UNITED STATES PATENT OFFICE 2,046,952

ELECTRICAL REGULATING SYSTEM

Richard H. Kaufmann, Schenectady, N. Y., assignor to General Electric Company, a corporation of New York Application November 1, 1934, Serial No. 750,945

11 Claims. (Cl. 171—313)

My invention relates to improvements in electrical regulating systems, and more particularly to improvements in inductance regulated constant current variable frequency and variable voltage alternating current power supply systems adapted to supply energy to a load having a counter voltage.

Although my invention is capable of general application the particular application which I at present consider to be the primary one is to battery charging systems for vehicles, such as automobiles. It has been proposed to charge an automobile storage battery from an engine driven alternating current generator, or alternator, through a rectifier, and to regulate the charging current and maintain it substantially constant by means of an inductance in the generator circuit. The theory is that as the voltage and frequency of an alternator are both directly proportional to its speed, the ohmic value of the inductance will change in proportion to the voltage of the alternator so that any given substantially zero resistance load, like a storage battery, will have constant current maintained in it regardless of the speed of the alternator neglecting, for the moment, the counter voltage of the battery. By selecting the value of the inductance such as to produce a constant current giving a battery charging rate substantially equal to the average discharge rate of the battery, the battery will be maintained substantially fully charged. Such a system, however, has certain disadvantages. Thus, it requires a considerable increase in speed and voltage of the generator from its initial zero value for the current to build up from zero to the substantially constant value. In other words, it requires a certain definite minimum voltage in order to overcome the countervoltage of the battery. From this point on it requires a substantial further increase in speed and voltage of the generator for its voltage to increase sufficiently to build the current up beyond the cut-in point to the substantially constant value which is then maintained on all further increases in speed. Furthermore, at the cut-in speed, when the current just commences to flow and the voltage of the generator just overcomes the counter voltage of the battery, the generator will be operating at relatively low power factor due to the inductance in its circuit. Consequently, at these relatively low speeds and low power factor, it is necessary to build a relatively larger generator for carrying the load than is required at high speed when ample generating capacity and power output can be obtained from a much smaller machine.

In accordance with my invention, I overcome these difficulties by means of a series capacitor connected in circuit with the alternator and having such a value of capacitance as to cause series resonance in the alternating current circuit at a frequency corresponding to the voltage at the cut-in point, when the current just commences to flow. This causes a very rapid build-up of current at this point due to the fact that the series resonance reduces the effective impedance of the circuit to its resistance only. From another point of view, this rapid build-up of current extends, or increases, the constant current range of the system so that at speeds corresponding to the cut-in point and slightly above, the battery will be receiving its normal charge, whereas in the previously described proposed system the battery will be receiving but a fraction of its normal charging current. Furthermore, the series resonance phenomenon, in reducing the reactance of the alternator circuit substantially to zero, causes the alternator to operate at greatly increased power factor so that a smaller physical size alternator may be employed than in the previously described system.

As the speed of the alternator is increased beyond the cut-in point, the frequency increases in direct proportion and consequently the reactive value of the capacitor becomes less and less, while the reactive, or ohmic value of the inductance becomes greater and greater so that at normal operating speeds the alternating current circuit is almost entirely inductive and the current is regulated by means of this inductance to the substantially constant value.

The capacitor, or electrostatic condenser, is entirely independent of temperature or other atmospheric conditions, its characteristics are not affected by age, and it has no moving parts, so that the improvement resulting from its use has almost no accompanying disadvantages.

By interposing a transformer between the alternator circuit and the rectifier in the battery charging circuit, it is possible to operate the alternating current circuit at relatively high voltages and by proper design of the reactive characteristics of the alternating current circuit and a proper selection of the ratio of the transformer, it is possible to provide a system in which the ordinary 110 volt, 60 cycle commercial power supply may be directly connected to the alternating current side of my power supply system so as to charge the storage battery at the proper voltage for trickle charging at such times as the battery should become discharged and the vehicle not be running, as for example, when it is in a garage. The 110 volt supply may be connected directly across the primary winding of the transformer although if it is inserted in series in this circuit the inductance or reactance of the circuit will act as a stabilizer in case of relatively small voltage changes in the 110 volt supply, which, due to the relatively low normal resistance of a storage battery, would tend to produce relatively large changes in current. Therefore, for best results with the shunt connection of the 110 volt, 60 cycle supply, a stabilizing impedance, or fullest resistance should be inserted in the supply circuit.

An object of my invention is to provide a new and improved electrical regulating system.

An additional object of my invention is to provide a new and improved electrical power supply system.

Another object of my invention is to provide a new and improved battery charging system.

A further object of my invention is to provide a new and improved reactance regulated constant current variable frequency and variable voltage alternating current power supply system adapted for supplying power to loads having a counter voltage.

My invention will be better understood from the following description taken in connection with the accompanying drawing and its scope will be pointed out in the appended claims.

In the drawing, Fig. 1 is a diagrammatic showing of an elementary circuit embodying my invention; Fig. 2 is a set of operating characteristic curves for contrasting the operation of the previously proposed system with the system employing my invention; and Fig. 3 is a more detailed diagrammatic showing of a modified form of my invention adapted for use in an automobile battery charging system.

In Fig. 1 there is shown an alternating current circuit 1 containing an alternator 2, an inductance, or reactance 3, and a capacitor, or condenser 4. This circuit is connected to the alternating current terminals of a rectifier 5 for supplying a direct current load circuit consisting of a storage battery 6. Rectifier 5 may be of any suitable type and is shown as of the bridge connected copper oxide type. Connected in shunt with the capacitor 4 is an impedance in the form of a resistor 7. The resistance of the series circuit comprising the generator, reactor, capacitor, rectifier and battery is relatively low and the inductive and capacitive values of the reactor 3 and the capacitor 4 are so proportioned that at the frequency of the alternator 2 corresponding to a generated voltage which is just sufficient to start a current flow in the circuit, against the counter voltage of the battery 6, these two devices will produce series resonance in the circuit. Consequently, the impedance of the entire circuit is very low at this voltage and frequency and the current builds up very rapidly. If now the generator 2 has its speed of rotation increased, its frequency also increases and, as the ohmic value of the capacitor 4 changes inversely with increases in frequency whereas the ohmic value of the reactor 4 increases in direct proportion to increases in frequency, the circuit becomes inductive. At the higher frequencies, at which it is intended normally to operate the generator 2, the effect of the capacitor 4 is negligible and the current is maintained at a substantially constant value by means of the reactor 3. The reason that reactor 3 maintains substantially constant current is that practically all increases in voltage are absorbed in the increased voltage drop in the reactor 3, whose ohmic value increases in direct proportion to increases in voltage. Thus, for example, if the voltage of alternator 2 doubles, the ohmic value of reactor 3 also doubles so that, with constant current, the reactance voltage drop in the reactor 3 doubles and, as there is a negligible resistance voltage drop in the circuit, it will be seen that practically the entire increase in voltage is absorbed in the increased voltage drop in the reactor 3. The particular value of inductance which is selected is one which provides a suitable charging current for the battery, corresponding for example to the average discharge current of the battery, for in this way the battery will be maintained substantially fully charged.

In Fig. 2 the solid curve 8 illustrates the operating characteristics of the system of Fig. 1 if the capacitor 4 and resistor 7 are omitted. The vertical coordinates represent current in the circuit and the abscissae, or horizontal distances from the origin, represent speed, frequency and internal generated voltage of the alternator 2, all of which latter quantities are directly proportional to each other. As will be seen, the current remains zero up to a predetermined value of speed or voltage corresponding to the counter voltage of the battery 6, whereupon the current starts to increase at a relatively gradual rate until it attains its final substantially constant reactance limited value. The dotted curve 9 illustrates the change in the characteristic caused by the introduction of the capacitor 4 alone. As will be seen, as soon as the cut-in point is reached, when the current starts to increase, the current does so practically instantaneously and at a very rapid rate and with further increases in speed the current decreases and finally attains the constant value which it is desired to maintain. It will be noted, however, that the resonant peak current may attain a value which is considerably higher than the desired normal or constant value. If desired or found necessary, this resonant peak current may be reduced and controlled by means of an impedance device, such as the resistor 7 connected in shunt with the capacitor 4. It should be understood, however, that my invention is not limited to the use of a shunt resistor 7 and that any other suitable impedance device, such for example as a combination of resistance, reactance and capacitance, for getting any desired characteristic or resonant peak current may be equally well employed. It should also be understood that my invention is not limited to the use of a shunt impedance of any kind and that this impedance is merely added to improve the operation in certain cases. The modified characteristic obtained by the use of a shunt resistance 7 is shown by the curve 10 wherein the current does not rise quite as rapidly as in curve 9, but it also does not extend as far above the normal value.

In Fig. 3 the alternator is of the inductor type comprising a rotatable inductor member 11, a direct current field winding 12 and an alternating current power winding 13. The winding 13 is designed to have a self-inductance corresponding to the inductance of the reactor 3 in Fig. 1 so that an extra or additional external inductance is unnecessary. This is a desirable feature as it limits inherently the external or terminal voltages which can be attained in the system. Thus in Fig. 1 relatively high terminal voltages of the alternator 2 will be produced and these voltages will be absorbed in the reactor 3 so that across both the devices 2 and 3 there will be relatively high voltages. However, in Fig. 3, although the internal generated voltage corresponding to the open circuit voltage of the inductor-alternator may be relatively high, or attain values corresponding to those attained in Fig. 1, whenever the circuit of the winding 13 is closed and current can flow therein the voltage drop takes place within the generating winding 13 so that high terminal voltages are never produced in the circuit. A further difference between Fig. 3 and Fig. 1 is that the capacitor 4 is connected in circuit by means of a transformer 14. By this means it is possible to operate the capacitor at any desired voltage so as to obtain a capacitor of suitable physical size. Furthermore, instead of employing a copper oxide rectifier as in Fig. 1, a hot cathode, double anode arc discharge type rectifier 15 is employed and as shown this rectifier is energized from a step-down power transformer 16 having a primary winding 17 connected in the alternator circuit and having a secondary winding 18 included in the anode-cathode-battery circuit. This transformer is also provided with a suitable auxiliary cathode heating winding 19. The connections of the rectifier 15 to the windings 18 and 19 and to the battery 6 are conventional connections and are well understood by those skilled in the art.

The direct current exciting winding 12 of the inductor-alternator is preferably excited from the battery 6, but as it is undesirable to energize this winding when the generator is not being driven it is shown connected to the battery through the ignition switch for the vehicle so that only when the ignition switch is closed will the exciting winding 12 be energized.

Connected in the alternating current circuit is a series socket 20 adapted to receive an ordinary plug 21 of the type utilized in household lighting circuits and this plug is connected to a supply circuit 22 connected to the ordinary 110 volt 60 cycle house lighting circuit. The series socket 20 is of the type which completes the circuit when no plug is inserted therein, but as soon as a plug is inserted therein the circuit is then made through the circuit to which the plug is attached. Such series sockets are well known in the art, and may for example, consist of a pair of spring fingers which are normally urged together so as to complete the circuit but which are separated by the prongs of the cooperating plug.

In Fig. 3 the ratio of the transformer 16 and the value of the reactances in the alternating current circuit are such that when 110 volts at 60 cycles is supplied to the circuit through the plug 21 the output of the rectifier will be at a voltage sufficient to trickle charge the battery 6 at a relatively low value of current. By means of this connection the reactance of the circuit acts to stabilize it so that relatively small voltage changes such as changes of plus or minus one or two volts in the alternating current supply circuit will not appreciably affect the trickle charging current. If the alternating current supply were connected directly across the primary winding 17, or across a fraction of it so as to secure the proper voltage, the circuit would be relatively unstable and would be subject to wide current fluctuations, due to the facts that it would contain relatively small reactance and the resistance of the battery 6 is low. However, with the connection shown, the reactance of the alternating current circuit provides a double function, namely in regulating for constant current at the variable frequencies of operation of the alternator 2, while at the same time acting as a stabilizer for trickle charging from the commercial 110 volt 60 cycle supply. Such a provision for trickle charging is obviously a very desirable one and is extremely simple and requires no auxiliary apparatus, such as auxiliary rectifiers, step-down transformers and such, as these elements are all incorporated in the system and are used for other purposes during normal operation of the system. Consequently, all that a vehicle operator needs in order to bring a discharged battery back to charge is to run an ordinary line from the house lighting circuit to the series socket 20.

The operation of Fig. 3 is otherwise the same as the operation of Fig. 1.

While I have shown and described particular embodiments of my invention, it will be obvious to those skilled in the art that changes and modifications may be made and I, therefore, aim in the appended claims to cover all such changes and modifications as fall within the true spirit and scope of my invention.

What I claim as new and desire to secure by Letters Patent of the United States is:

1. The combination with an inductance regulated, substantially constant current, variable voltage and variable frequency power supply system for a load having a counter voltage, of means for extending the constant current characteristic of said system to the relatively low frequency corresponding to a voltage which substantially corresponds to the counter voltage of the load comprising a capacitance for producing series resonance at said frequency.

2. The combination with an inductive reactance regulated, constant current, variable voltage and frequency power supply system for a counter voltage type load, of means for increasing the rate of change of current with changes in voltage and frequency in said system at a frequency corresponding to a voltage substantially corresponding to the counter voltage of the load comprising a capacitive reactance for producing series resonance at said frequency.

3. The combination with an inductive reactance regulated constant current variable voltage and frequency power supply system for a counter voltage type load, of means for increasing the rate of change of current with changes in voltage and frequency in said system at a frequency corresponding to a voltage substantially corresponding to the counter voltage of the load comprising a capacitive reactance for producing series resonance at said frequency, and means for limiting the resonance peak current comprising an impedance connected in parallel with said capacitive reactance.

4. In combination, a variable speed driven alternator, a storage battery connected thereto through a rectifier, an inductance in circuit with said alternator for regulating the current when the alternator voltage exceeds the battery voltage, and a capacitance in circuit with said inductance for producing series resonance at a value of frequency corresponding to a voltage of said rectifier which is substantially equal to the voltage of said battery.

5. In combination, a variable speed driven alternator, a storage battery connected thereto through a rectifier, an inductance in circuit with said alternator for regulating the current when the alternator voltage exceeds the battery voltage, and a capacitance in circuit with said inductance for producing series resonance at a value of frequency corresponding to a voltage of said rectifier which is substantially equal to the voltage of said battery, and an impedance in parallel with said capacitance for limiting the resonance peak current.

6. An electric circuit, a widely variable speed, frequency and voltage alternating current generator connected therein, a load having a counter voltage and adapted to receive energy at substantially constant current connected therein, an inductance connected therein and having such a reactance as substantially to limit the current in said circuit to said constant value, a capacitance connected in said circuit and having such a reactance as to cause series resonance with said inductance at the frequency corresponding to a voltage which just exceeds the counter voltage of said load, and a resistor in parallel with said capacitance for limiting the resonance peak current in said circuit.

7. In a battery charging system for use on vehicles, an alternator driven by said vehicle at a speed substantially proportional to the speed of said vehicle, a storage battery connected to said alternator through a full wave rectifier, an inductance in circuit with said alternator for giving said system substantially constant current characteristics, and a capacitance in circuit with said alternator for extending the substantially constant current range of said system to an alternator voltage corresponding to the voltage of said battery by means of resonance at frequencies corresponding to said voltage.

8. A vehicle battery charging system comprising, in combination, a vehicle driven alternating current generator, a rectifier, and a transformer interconnecting said generator and rectifier, said transformer having such a ratio that if a 110 volt supply source is connected in the circuit of its primary winding the voltage of its secondary winding will be of the proper value to cause said rectifier to trickle charge an automobile storage battery, and means adapted to connect a standard 110 volt 60 cycle supply source in said primary winding circuit.

9. In a reactance regulated constant current alternating current power supply system for charging a vehicle storage battery, in combination, a normally relatively high voltage reactive alternator circuit, a relatively low voltage direct current battery charging circuit, a voltage step down transformer interconnecting said circuits, a series socket in said reactive alternator circuit adapted to receive a standard 110 volt house wiring plug, said transformer having such a voltage ratio and said alternating circuit having such a reactance that when a commercial 110 volt, 60 cycle alternating current supply is connected to said series socket a substantially constant voltage sufficient for trickle charging a storage battery will be applied to said battery charging circuit.

10. In combination, a variable speed driven alternator, a counter voltage load connected thereto, said alternator having a self inductance sufficiently high to limit the current therein to a substantially constant value over a wide range of speeds, and a capacitor for producing series resonance with the inductance of said alternator at a frequency substantially corresponding to a generated voltage sufficient to start a current flow against the counter voltage of said load.

11. An automobile battery charging system comprising, in combination, an engine driven inductor alternator having a direct current exciting winding and an alternating current power winding, a voltage step down transformer having its primary winding connected to be energized by said alternator, a rectifier, a storage battery connected to be charged from the secondary winding of said transformer through said rectifier, said power winding having sufficient self inductance normally to limit the current in said system to a predetermined constant value corresponding to an adequate average charging current for said battery regardless of the generated voltage and frequency of said alternator, means for increasing the rate of rise of current in said system to said normally constant value when said alternator is speeded up from rest and its generated voltage attains a value sufficiently high to start current flowing in said system against the counter voltage of said battery comprising a series capacitor in circuit with the power winding of said alternator for producing series resonance therewith at a frequency corresponding to said generated voltage, and means for limiting the resonance peak current substantially to said normally constant value.

RICHARD H. KAUFMANN.